US011688876B2

(12) United States Patent
Naito et al.

(10) Patent No.: US 11,688,876 B2
(45) Date of Patent: Jun. 27, 2023

(54) FUEL CELL SYSTEM

(71) Applicant: HONDA MOTOR CO., LTD., Tokyo (JP)

(72) Inventors: Hideharu Naito, Wako (JP); Takashi Takura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 17/680,216

(22) Filed: Feb. 24, 2022

(65) Prior Publication Data

US 2022/0293995 A1 Sep. 15, 2022

(30) Foreign Application Priority Data

Mar. 15, 2021 (JP) ............................ JP2021-041229

(51) Int. Cl.

*H01M 8/2475* (2016.01)
*H01M 8/04537* (2016.01)
*H01M 8/0247* (2016.01)
*H01M 8/0273* (2016.01)

(52) U.S. Cl.

CPC ....... *H01M 8/2475* (2013.01); *H01M 8/0247* (2013.01); *H01M 8/04559* (2013.01); *H01M 8/0273* (2013.01); *H01M 2250/20* (2013.01)

(58) Field of Classification Search

CPC ............. H01M 8/2475; H01M 8/0247; H01M 8/04559; H01M 8/0273; H01M 2250/20
See application file for complete search history.

(56) References Cited

U.S. PATENT DOCUMENTS

2016/0226084 A1 8/2016 Itoga
2019/0260059 A1* 8/2019 Mizusaki .......... H01M 8/04089
2020/0067108 A1* 2/2020 Yoshitomi ........... H01M 8/0273
2020/0161691 A1 5/2020 Yoshitomi
2022/0271320 A1* 8/2022 Naito ................. H01M 8/2475

FOREIGN PATENT DOCUMENTS

JP 2015-076152 A 4/2015
JP 2020-029190 A 2/2020
JP 2020-082753 A 6/2020

* cited by examiner

*Primary Examiner* — Stewart A Fraser

(74) *Attorney, Agent, or Firm* — Carrier Shende & Associates, P.C.; Joseph P. Carrier; Fulchand P. Shende

(57) ABSTRACT

A fuel cell system which is mounted in a vehicle is equipped with a stack case in which a fuel cell stack is accommodated. A rearward opening is formed at a rear portion of the stack case facing toward the rear of the vehicle. Cell voltage detection terminals that are electrically connected to electrodes of the fuel cell stack are exposed in the rearward window. A filter cover which is configured to include a filter material is provided on the rearward opening. The filter cover has a vehicle heightwise direction rib that extends along a heightwise direction of the vehicle.

9 Claims, 8 Drawing Sheets

UP
VEHICLE HEIGHT
DOWN
71 36d 40 18 (34) 60 106Lu 104 102 106Lm 61 70 76 20 78 118 106Ru 122 72 120 106Rd 106Ld 116 100 80 74 122 120 114 122
VEHICLE LENGTH FRONT REAR
LEFT VEHICLE WIDTH RIGHT

VEHICLE LENGTH
FRONT
REAR
VEHICLE HEIGHT
UP
DOWN
10
12
14
15
16
18
20
22
24
26
28a
28b
30a
30b
32
36a
36b
36c
36d
150
152

10
20
36b
36c
42b
36f
18
40
34
60
61
70
36a
36e
42a
56
44
58
36d
54
48
50
46
150
154
152
158
156
VEHICLE LENGTH
FRONT
REAR
VEHICLE HEIGHT
UP
DOWN
VEHICLE WIDTH
LEFT
RIGHT 20
18 (34)
60
40
36d
61
76
78
72
106Ru
106Rd
100
104
106Ld
106Lu
80
71
102
106Lm
74
120
116
122
118
114
70
120
122
122
122
VEHICLE LENGTH
FRONT
REAR
VEHICLE HEIGHT
UP
DOWN
VEHICLE WIDTH
LEFT
RIGHT 72
98
96
90
100
FRONT
VEHICLE LENGTH
REAR
106Ru
108
106Rd
104
106Lu
106Ld
94
102
106Lm
92
VEHICLE WIDTH
RIGHT
LEFT
UP
VEHICLE HEIGHT
DOWN 74
112U
72
94
98
HYDROGEN
106Lu
118
102
92
71
76
80
78
106Lm
106Ld
AIR
100
112D
UP
VEHICLE
HEIGHT
DOWN
VEHICLE
LENGTH
REAR
FRONT 74B
112R
114
112U
116
112D
118
112L
UP
VEHICLE HEIGHT
DOWN
LEFT
VEHICLE WIDTH
RIGHT

FUEL CELL SYSTEM

CROSS-REFERENCE TO RELATED APPLICATIONS

This application is based upon and claims the benefit of priority from Japanese Patent Application No. 2021-041229 filed on Mar. 15, 2021, the contents of which are incorporated herein by reference.

BACKGROUND OF THE INVENTION

Field of the Invention

The present invention relates to a fuel cell system in which a fuel cell stack is mounted in a vehicle in a state with the fuel cell stack accommodated in a stack case.

Description of the Related Art

In the case that a fuel cell system including a fuel cell stack is mounted in a vehicle, for example, as described in JP 2015-076152 A, a configuration in which the fuel cell stack is accommodated in a stack case has been widely adopted. In such a stack case, as shown in FIG. 1 of JP 2015-076152 A, a ventilation cover is provided on a wall surface covering an end in a stacking direction of unit cells that make up the fuel cell stack. In the case that hydrogen gas leaks out from the fuel cell stack, it has been attempted to discharge the hydrogen gas to the exterior of the stack case through the ventilation cover which is configured to include a filter material.

In this instance, the fuel cell system is configured to include a voltage control unit (VCU) that controls the voltage of the fuel cell stack. The VCU is accommodated in a case, and such a case, for example, as shown in JP 2020-082753 A and JP 2020-029190 A, is disposed rearwardly of the stack case. A rearward opening (referred to as a “rear window” in JP 2020-082753 A) is formed in a rear portion of the stack case. The front of the case in which the VCU is accommodated faces toward the opening.

The fuel cell stack is provided with cell voltage detection terminals (also referred to as “cell V terminals”), which are electrically connected via harnesses to respective electrodes of the fuel cell stack. The cell V terminals are exposed in the rearward opening. Accordingly, an operator is capable of inserting his or her hand through the rearward opening and performing maintenance on the terminals and the vicinity thereof. In this manner, the rearward opening serves as a window for performing work.

SUMMARY OF THE INVENTION

It may be considered to attach the ventilation cover disclosed in JP 2015-076152 A to the rearward opening disclosed in JP 2020-082753 A and JP 2020-029190 A. However, as discussed previously, the harnesses of the cell V terminals are exposed in the rearward opening. Therefore, for example, when a row of unit cells becomes bent so as to bulge outward toward the rearward opening, a load is imposed on the ventilation cover due to the harnesses pressing on the ventilation cover. If such a load is excessive, there is a concern that the ventilation cover may become bent, and the filter material may be permanently deformed as a result thereof.

A principal object of the present invention is to provide a fuel cell system which is provided with a filter cover that exhibits sufficient rigidity to protect the filter material.

According to one aspect of the present invention, there is provided a fuel cell system configured to be mounted in a vehicle equipped with a fuel cell stack, and a stack case in which the fuel cell stack is accommodated, wherein the fuel cell stack is configured by unit cells being stacked along a vehicle widthwise direction, a rearward opening, in which cell voltage detection terminals electrically connected to electrodes of the unit cells are exposed, is formed at a rear portion of the stack case facing rearwardly in a traveling direction of the vehicle, together with a filter cover including a filter material being provided on the rearward opening, and the filter cover includes a vehicle heightwise direction rib configured to extend along a heightwise direction of the vehicle.

In the present invention, a vehicle heightwise direction rib that extends along the vehicle heightwise direction is provided in the filter cover that covers the rearward opening of the stack case. Owing to the vehicle heightwise direction rib, rigidity is imparted to the filter cover. Accordingly, even in the case that conductive wires, which extend outwardly from the cell voltage detection terminals exposed in the rearward opening, come into contact with the filter cover, it is possible to prevent the filter material from becoming permanently deformed or damaged. More specifically, the filter material can be appropriately protected.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

A preferred embodiment of a fuel cell system according to the present invention will be presented and described in detail below with reference to the accompanying drawings. Moreover, in the following description, the terms “left (ward)”, “right(ward)”, “front(ward)”, “rear(ward)”, “down (ward)”, and “up(ward)” represent a left side, a right side, a front side, a rear side, a lower side, and an upper side from the perspective of a user who is seated in a driver’s seat. Further, a vehicle widthwise direction is synonymous with a left-right direction of the vehicle, a vehicle lengthwise direction is synonymous with a front-rear direction or a traveling direction of the vehicle, and a vehicle heightwise direction is synonymous with a vertical direction of the vehicle.

Figure 1:
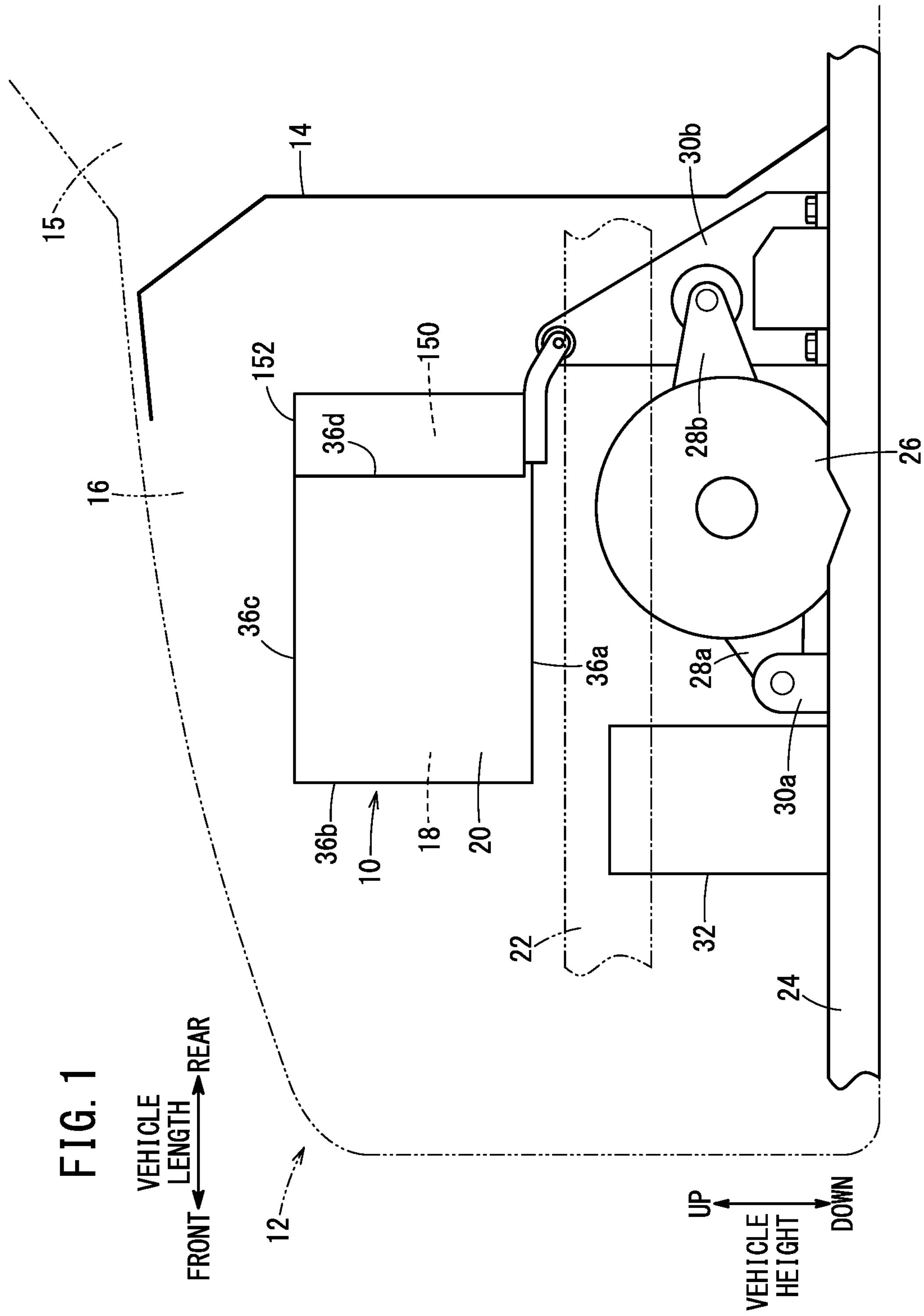
FIG. 1 is a schematic side view of principal components of a vehicle equipped with a fuel cell system according to an embodiment of the present invention.

FIG. 1 is a schematic side view of principal components of a fuel cell vehicle 12 (vehicle) equipped with a fuel cell system 10 according to a present embodiment. A front room 16 is provided in the front of the fuel cell vehicle 12 so as to be isolated from a passenger compartment 15 by a dashboard 14. A stack case 20 in which a fuel cell stack 18 is accommodated is disposed in the front room 16.

A side frame 22 and a cross member 24 constituting a vehicle body frame are provided in the front room 16. The side frame 22 extends in the vehicle lengthwise direction, and the cross member 24 extends in the vehicle widthwise direction at a more downward location than the side frame 22.

The fuel cell stack 18 carries out generation of electrical power based on electrochemical reactions taking place between a fuel gas and an oxygen containing gas supplied from a fuel gas supply device and an oxygen containing gas supply device (neither of which is shown). The fuel cell stack 18 supplies a generated electrical power that is generated by generation of electrical power to a traveling motor 26 and a non-illustrated battery provided in the front room 16.

In this case, the traveling motor 26 is arranged below the fuel cell stack 18 or the stack case 20. The traveling motor 26 serves to propel the fuel cell vehicle 12 via a non-illustrated transmission, the vehicle wheels, and the like. A front side of the traveling motor 26 is fixed to the cross member 24 via a motor bracket 28*a* and a frontward supporting body 30*a*. A rear side of the traveling motor 26 is fixed to the cross member 24 via a motor bracket 28*b* and a rearward supporting body 30*b*.

A PDU (Power Drive Unit) 32 that supplies a suitable amount of electrical power to the traveling motor 26 is provided at a more frontward location than the traveling motor 26. The PDU 32 is configured in the form of a three-phase bridge type inverter, converts the generated electrical power (DC power) of the fuel cell stack 18 into AC power, and based on the control of a non-illustrated ECU, adjusts a rotary driving force of the traveling motor 26.

Figure 2:
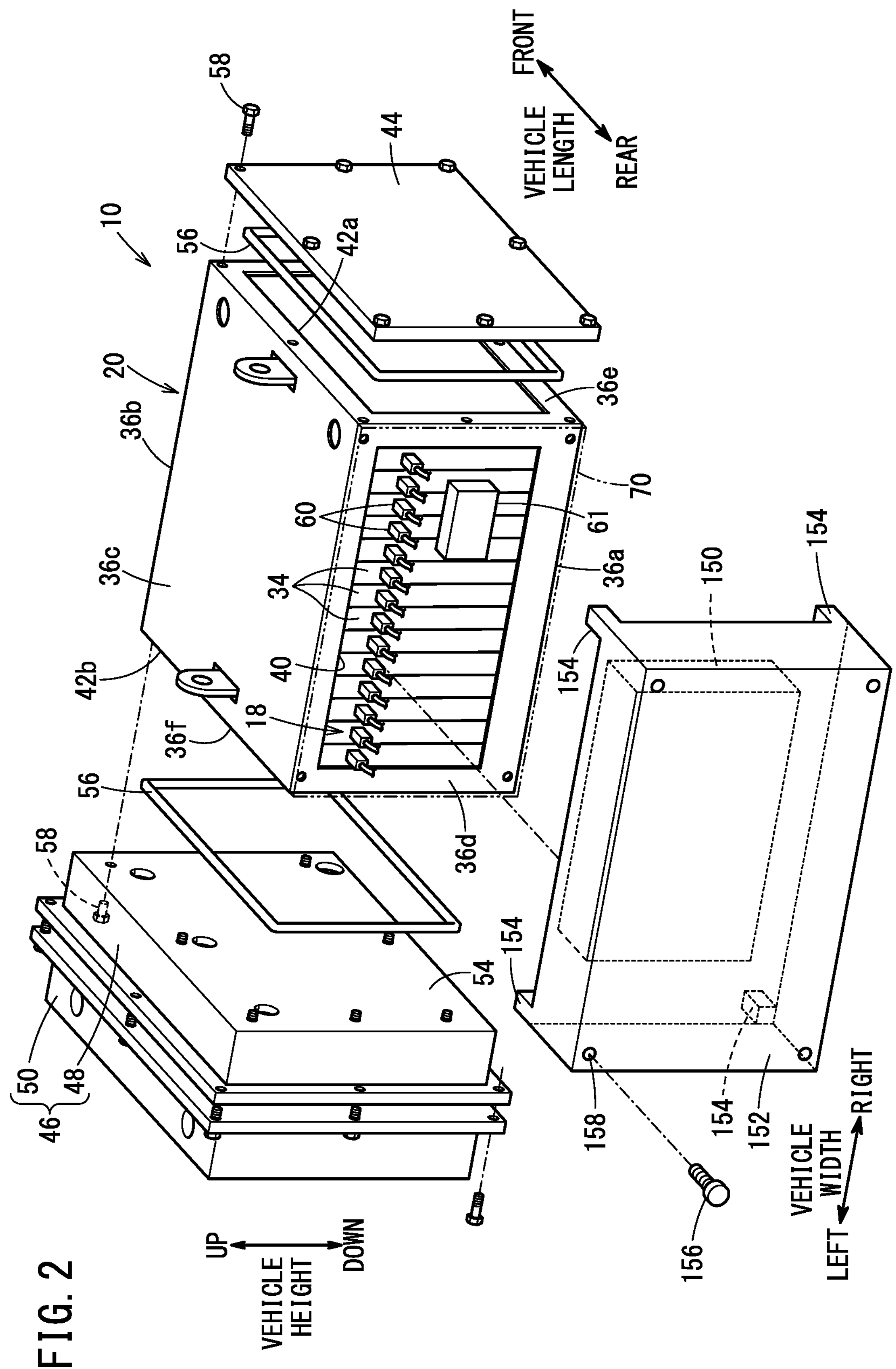
FIG. 2 is a schematic perspective view as seen from the rear of a stack case constituting the fuel cell system.

As shown in FIG. 2, the fuel cell stack 18 comprises a plurality of unit cells 34 stacked along the vehicle widthwise direction. The fuel cell stack 18 is accommodated in such a state in the interior of the stack case 20. At this time, the electrodes of the unit cells 34 are in a standing posture.

The stack case 20 includes a bottom wall portion 36*a*, a front wall portion 36*b*, and an upper wall portion 36*c*. On the other hand, a rearward opening 40 is formed in a rear portion 36*d* of the stack case 20. Further, a right opening 42*a* and a left opening 42*b* are also formed respectively on a right side portion 36*e* and a left side portion 36*f* of the stack case 20 in the vehicle widthwise direction.

At the right end in the stacking direction (vehicle widthwise direction) of the unit cells 34, a non-illustrated first terminal plate and a first insulating plate are arranged sequentially in this order toward an outer side, and are accommodated inside the stack case 20. Further, the first end plate 44 is attached to the right side portion 36*e* of the stack case 20. The first end plate 44 closes the right opening 42*a* of the stack case 20, and imparts a tightening load in the stacking direction to a stacked body of the unit cells 34.

Similarly, also at the left end in the stacking direction of the unit cells 34, a non-illustrated second terminal plate and a second insulating plate are arranged sequentially in this order toward an outer side, and are accommodated inside the stack case 20. Further, an auxiliary equipment case 46 is attached to the left side portion 36*f* of the stack case 20.

The auxiliary equipment case 46 includes a concave shaped first case member 48 that is screwed-engaged with the stack case 20, and a concave shaped second case member 50 that is joined to the first case member 48. In the interior of the case members, there are accommodated auxiliary equipment such as hydrogen-based auxiliary equipment (hydrogen gas supply devices: devices of the fuel cell system) such as pipes, an injector, a hydrogen pump, valves, and the like.

The first case member 48 includes a wall portion 54 that closes the left opening 42*b* on a left end side in the stacking direction of the stack case 20. The wall portion 54 functions as a second end plate that imposes a tightening load in the stacking direction to the stacked body of the unit cells 34. The first end plate 44 and the wall portion 54 are attached to the stack case 20 by connecting bolts 58, in a state with sealing members 56 being interposed between each of the end plates and the stack case 20.

Each of the electrodes (anodes, cathodes) at both ends of the stacked unit cells 34 are electrically connected to the first terminal plate and the second terminal plate. Furthermore, portions of both of the terminal plates protrude outwardly from openings of the upper wall portion 36*c* of the stack case 20, and are electrically connected to a VCU 150 via a non-illustrated contactor. On the other hand, cell V terminals (cell voltage detection terminals) 60 are electrically connected to each of the unit cells 34. Although not illustrated in particular, connecting locations are provided on outer peripheral edge portions of separators in each of the unit cells 34, and the cell V terminals 60 are electrically connected to the connecting locations.

Figure 7:
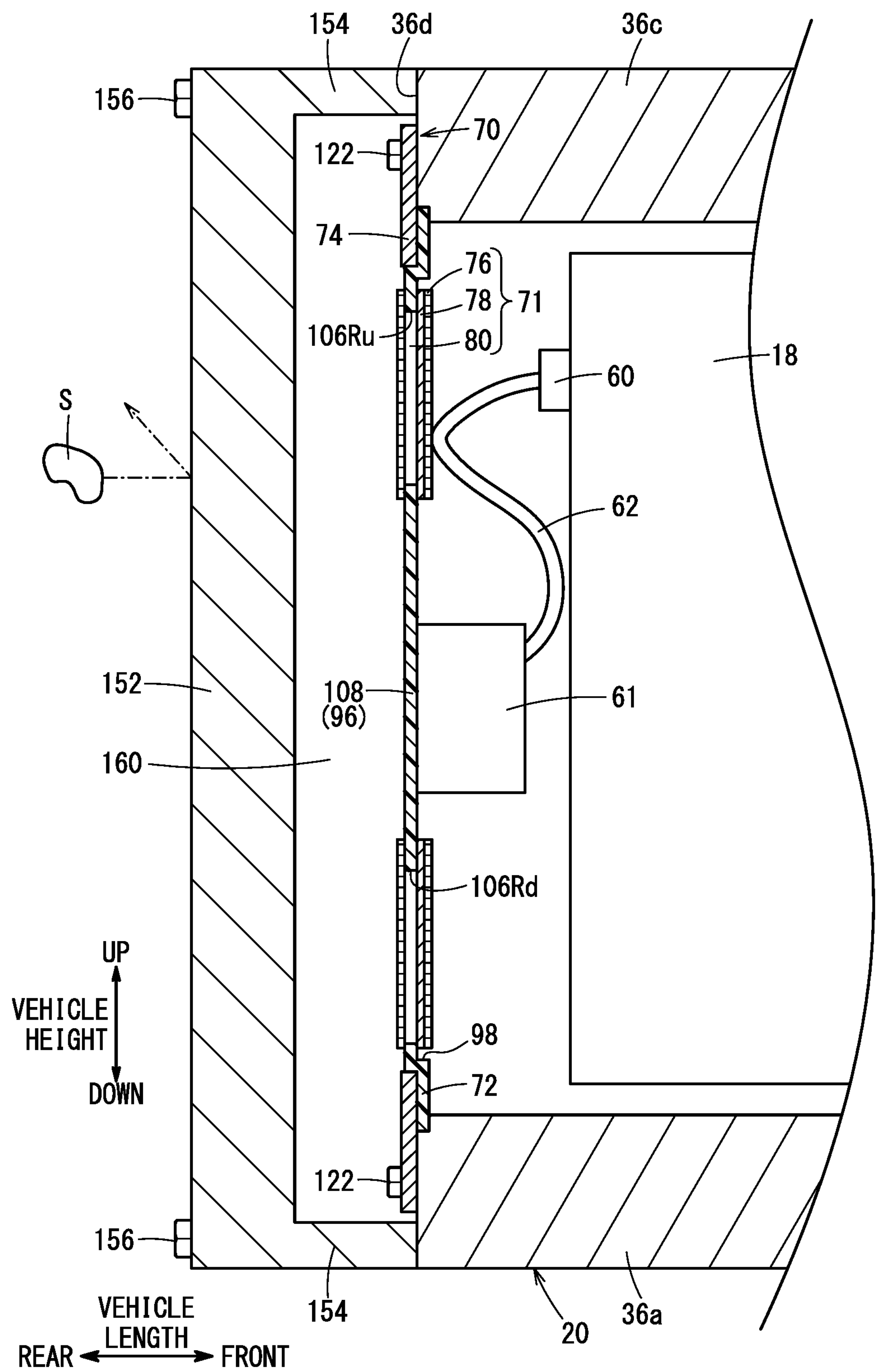
FIG. 7 is a schematic vertical cross-sectional side view showing a vicinity of a connected location between a stack case and an electrical equipment accommodating case.

The plurality of individual cell V terminals 60 are detachably provided at a rear portion of the fuel cell stack 18 facing toward the rearward opening 40, and are exposed in the rearward opening 40. In addition, as shown in FIG. 7, harnesses 62 (a bundled collection of conductive wires) through which the detected cell voltages are transmitted to a cell voltage control unit 61 extend from rear portions of the cell V terminals 60. The cell voltage control unit 61 gathers and internally processes the voltages detected at the cell V terminals 60, and then transmits the voltages to a control system of the fuel cell stack 18.

Figure 3:
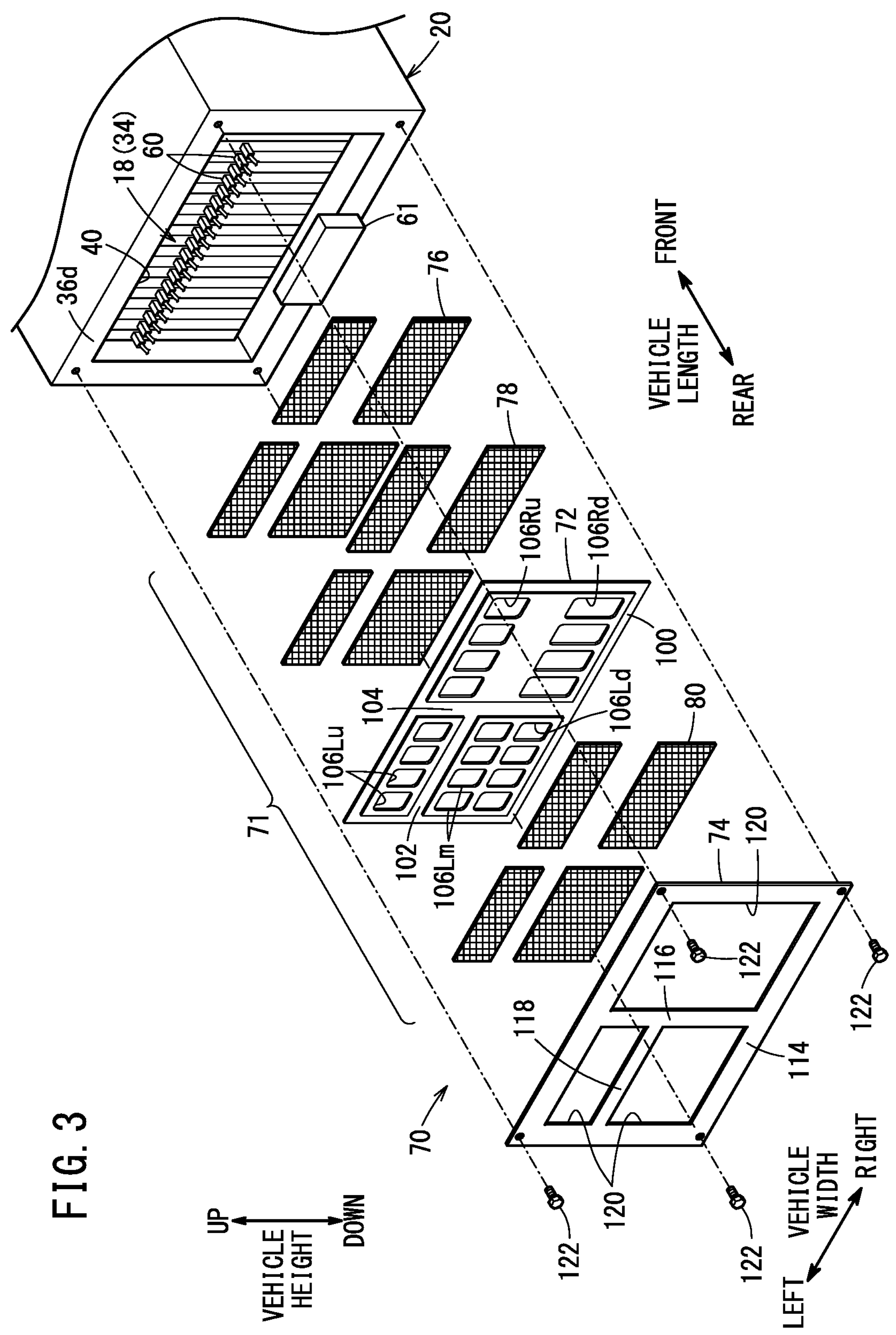
FIG. 3 is an exploded perspective view of a filter cover.
Figure 4:
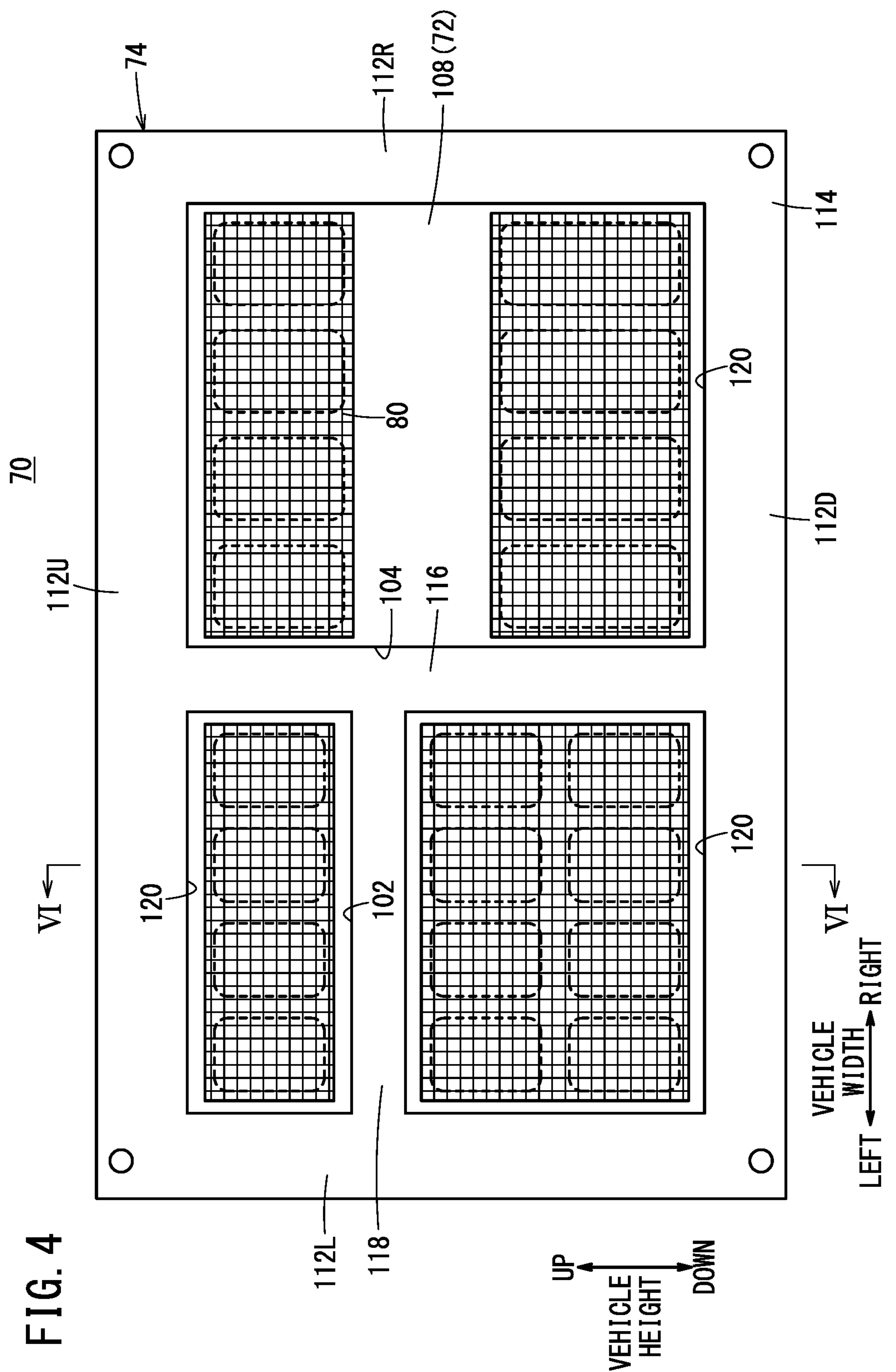
FIG. 4 is a schematic front view of the filter cover.

As shown in detail in FIGS. 3 and 4, a filter cover 70 is provided at the rearward opening 40. In the present embodiment, the filter cover 70 is configured to include a filter material 71, a retaining plate 72 (retaining member), and a seal plate 74 (retaining frame member).

The filter material 71 includes an inner protective mesh 76, a filter membrane 78, and an outer protective mesh 80. The filter cover 70 is constituted by arranging the inner protective mesh 76, the filter membrane 78, the retaining plate 72, the outer protective mesh 80, and the seal plate 74 sequentially in this order from a side in proximity to the stack case 20.

The inner protective mesh 76 and the outer protective mesh 80 are made of a mesh plate material in which comparatively large meshes are formed in a grid-like shape or a circular shape. In contrast thereto, the filter membrane 78 is a plate material having pores therein that are finer than those of the inner protective mesh 76 and the outer protective mesh 80. Accordingly, foreign matter that is not collected by the outer protective mesh 80 is collected by the filter membrane 78. The inner protective mesh 76 and the outer protective mesh 80 protect the filter membrane 78, which is sandwiched between both of the meshes 76 and 80.

The inner protective mesh 76 is made, for example, from a fiber reinforced resin material that is glass fiber impregnated with a resin. On the other hand, the outer protective mesh 80 is made from a metal such as an aluminum alloy or the like.

Figure 5:
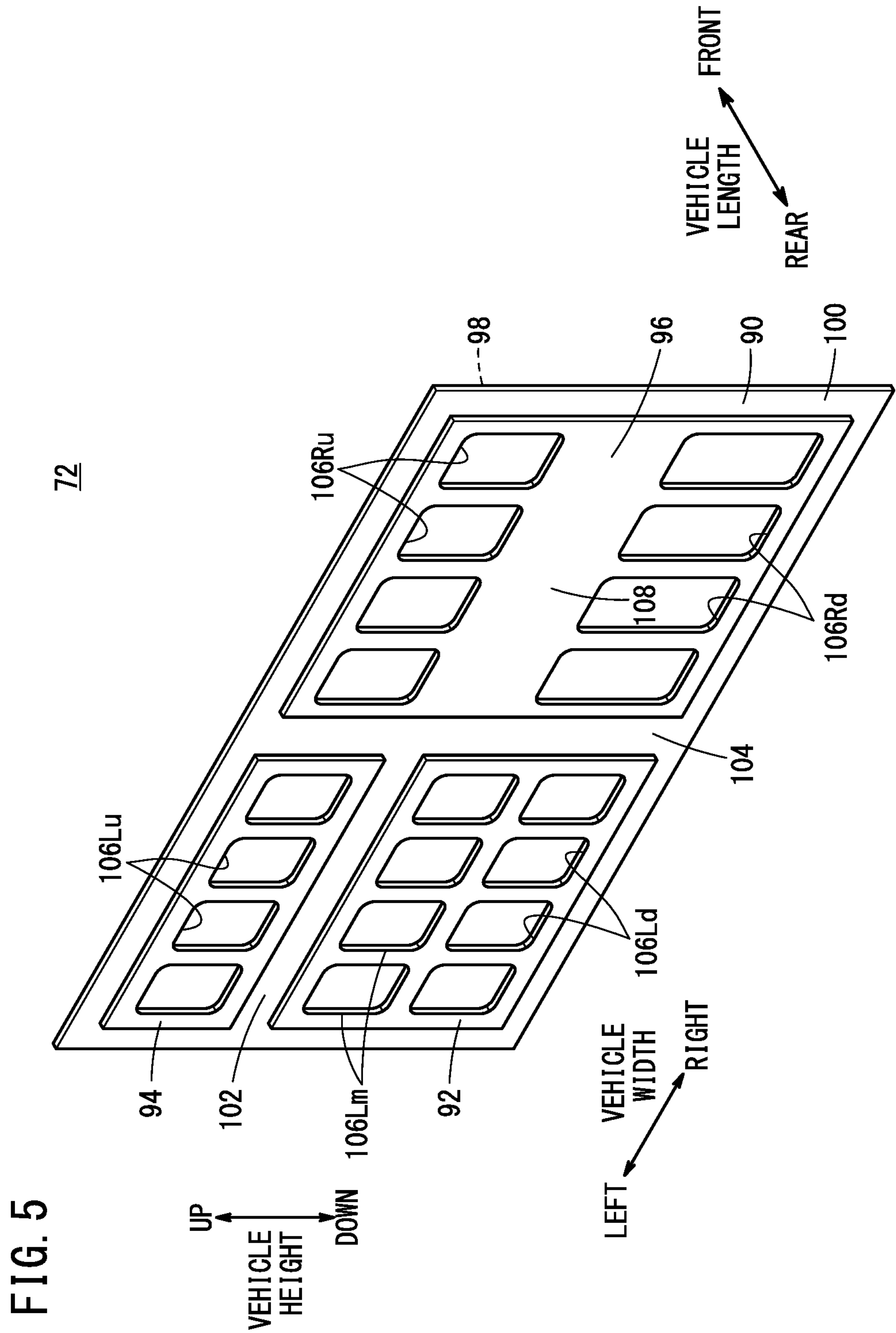
FIG. 5 is a schematic overall perspective view of a retaining plate (retaining member) constituting the filter cover.

Further, the retaining plate 72, in the same manner as the inner protective mesh 76, is made, for example, from a fiber reinforced resin material that is glass fiber impregnated with a resin. As shown in FIG. 5, the retaining plate 72 includes an outer edge frame 90, a lower left stepped convex portion 92, an upper left stepped convex portion 94, and a right stepped convex portion 96, which protrude out slightly on a side of the outer protective mesh 80, and which are inwardly surrounded by the outer edge frame 90. Due to the steps between the outer edge frame 90 and the three individual stepped convex portions 92, 94, and 96, an internal step 98 (refer to FIG. 7) of the retaining plate 72 is formed on a side facing toward the side of the stack case 20.

On the other hand, on a side of the retaining plate 72 facing toward the side of the outer protective mesh 80, a frame-shaped step 100 is formed by the steps between the outer edge frame 90 and the three individual stepped convex portions 92, 94, and 96. Further, between the lower left stepped convex portion 92 and the upper left stepped convex portion 94, a horizontally oriented step 102 is formed which extends along the vehicle widthwise direction. Furthermore, a vertically oriented step 104 is formed between the lower left stepped convex portion 92 and the upper left stepped convex portion 94, and the right stepped convex portion 96.

A plurality of individual ventilation openings 106Ld and 106Lm are formed in the lower left stepped convex portion 92 so as to be arranged alongside one another in two rows along the vertical direction, for example. Further, in the upper left stepped convex portion 94, a plurality of individual ventilation openings 106Lu are formed in the same number of columns as the number of columns of the ventilation openings 106Ld and 106Lm. The number of rows of the ventilation openings 106Lu, for example, is one. Furthermore, ventilation openings 106Rd and 106Ru are formed in the right stepped convex portion 96 so as to be arranged alongside one another in two rows along the vertical direction. The ventilation openings 106Ld, 106Lm, 106Lu, 106Rd, and 106Ru exhibit a vertically elongate rectangular shape, for example.

The ventilation openings 106Rd and the ventilation openings 106Ru are separated from each other by an interval substantially equivalent to the vehicle heightwise dimension of the ventilation openings 106Lm. Due to such an interval, a closed wall portion 108 is disposed between the ventilation openings 106Rd and the ventilation openings 106Ru. It goes without saying that the closed wall portion 108 forms a part of the wall surface of the right stepped convex portion 96. The cell voltage control unit 61 faces toward a front surface of the closed wall portion 108.

The inner protective mesh 76, the filter membrane 78, and the outer protective mesh 80 are each divided respectively into a plurality of individual portions corresponding to the grid-like positions of the retaining plate 72. More specifically, the respective sections of the inner protective mesh 76, the filter membrane 78, and the outer protective mesh 80 cover the ventilation openings 106Ld, 106Lm, 106Lu, 106Rd, and 106Ru individually or across upper and lower two columns.

As shown in detail in FIG. 4, the seal plate 74 includes a substantially rectangular outer frame portion 114 having four sides, and in particular, a left vertical side portion 112L, a right vertical side portion 112R, a lower side portion 112D, and an upper side portion 112U. The left vertical side portion 112L and the right vertical side portion 112R extend along the vehicle heightwise direction, and the lower side portion 112D and the upper side portion 112U extend along the vehicle widthwise direction. The left vertical side portion 112L is connected to left ends of the lower side portion 112D and the upper side portion 112U. On the other hand, the right vertical side portion 112R is connected to right ends of the lower side portion 112D and the upper side portion 112U. In addition, a vehicle heightwise direction rib 116 is bridged substantially in a middle portion of the lower side portion 112D and the upper side portion 112U in the vehicle widthwise direction. The vehicle heightwise direction rib 116 extends along the vehicle heightwise direction, and is connected to the lower side portion 112D and the upper side portion 112U. More specifically, the left vertical side portion 112L, the right vertical side portion 112R, and the vehicle heightwise direction rib 116 are in a mutually parallel relationship.

Further, the vehicle widthwise direction rib 118 (intersecting direction rib), which extends along the vehicle widthwise direction, is bridged substantially in a middle portion in the vehicle heightwise direction of the left vertical side portion 112L and the vehicle heightwise direction rib 116. The vehicle widthwise direction rib 118 intersects the vehicle heightwise direction rib 116 substantially perpendicularly. The lower side portion 112D, the upper side portion 112U, and the vehicle widthwise direction rib 118 are in a mutually parallel relationship. In addition, due to the vehicle heightwise direction rib 116 and the vehicle widthwise direction rib 118, three individual ventilation openings 120 are defined on the inner side of the outer frame portion 114.

As a preferred example of the material for the seal plate 74 having such a configuration, there may be cited a metal such as an aluminum alloy, in the same manner as the case of in the outer protective mesh 80.

Figure 6:
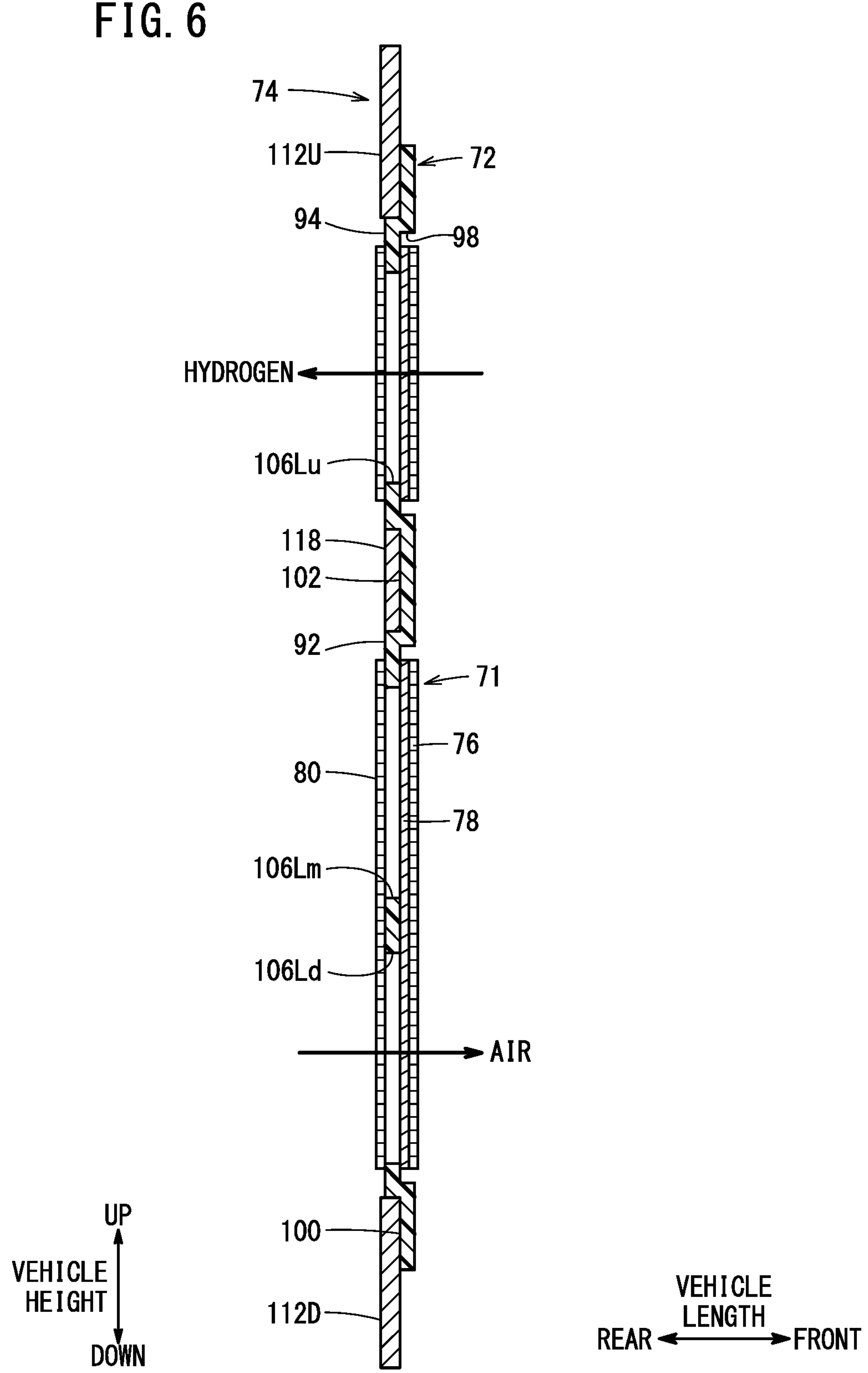
FIG. 6 is a cross-sectional view taken along line VI-VI in FIG. 4.

As shown in FIGS. 6 and 7, the internal step 98 is formed on a rear surface side of the retaining plate 72. The filter membrane 78 and the inner protective mesh 76 are accommodated on the internal step 98. In addition, by the seal plate 74 being connected by fixing bolts 122 to the rear portion 36*d* of the stack case 20, the rearward opening 40 is covered by the filter cover 70.

At this time, as shown in FIGS. 4 and 6, the inner periphery of the outer frame portion 114 of the seal plate 74 is engaged with the frame-shaped step 100 (see FIG. 5) on the outer periphery of the retaining plate 72. Further, the vehicle widthwise direction rib 118 is engaged with the concave horizontally oriented step 102 of the retaining plate 72, and the vehicle heightwise direction rib 116 is engaged with the concave vertically oriented step 104 of the retaining plate 72. Consequently, each of the members from the inner protective mesh 76 to the outer protective mesh 80 is backed up by the vehicle widthwise direction rib 118 and the vehicle heightwise direction rib 116. As a result, the rigidity of the filter cover 70 is assured.

In addition, according to the present embodiment, in a state in which the filter cover 70 is attached to the rearward opening 40 in the manner described above, the harnesses 62 are placed in contact with the inner protective mesh 76 that constitutes the filter cover 70.

Furthermore, as shown in FIGS. 2 and 7, a VCU case 152 (an electrical equipment storage case) in which there is accommodated the VCU 150, which is an item of electrical equipment, is connected to the rear portion 36*d* of the stack case 20. On a front wall portion of the VCU case 152 facing toward the stack case 20, four mounting members 154 are provided so as to project toward the stack case 20. Furthermore, through holes 158 through which mounting bolts 156 are passed are formed from a rear wall portion of the VCU case 152 until arriving at front end surfaces of the mounting members 154. By the mounting bolts 156 that have been passed through the through holes 158, engaging with non-illustrated bolt holes that are formed in the rear portion 36*d* of the stack case 20, the VCU case 152 is connected to the stack case 20, together with the filter cover 70 being retained in the stack case 20.

At this time, a gap is formed between the rear portion 36*d* (or the filter cover 70) of the stack case 20 and the front wall portion of the VCU case 152 by an amount equivalent to the protruding length of the mounting members 154. Therefore, as shown in FIG. 7, ventilation openings 160 are formed between the adjacent mounting members 154.

The fuel cell system 10 according to the present embodiment is basically constructed in the manner described above. Next, operations and advantageous effects of the fuel cell system 10 will be described.

In the case that the filter cover 70 is attached to the rear portion 36*d* of the stack case 20, the inner protective mesh 76, the retaining plate 72 by which the filter membrane 78 is retained, the outer protective mesh 80, and the seal plate 74 are superimposed in this order from a side in proximity to the stack case 20. Further, the seal plate 74 is connected to the rear portion 36*d* via the fixing bolts 122. Due to such a connection, the filter cover 70 including the filter material 71 is attached to the rear portion 36*d* of the stack case 20 in a manner so as to cover the rearward opening 40. Accompanying this attachment, as discussed previously, the outer frame portion 114 of the seal plate 74 is engaged with the frame-shaped step 100. Further, the vehicle widthwise direction rib 118 is engaged with the horizontally oriented step 102, and the vehicle heightwise direction rib 116 is engaged with the vertically oriented step 104.

At this time, the row of unit cells 34 may become bent in a manner so as to bulge outwardly toward the rearward opening 40. In this case, the harnesses 62 that extend from the cell V terminals 60 come into contact with the inner protective mesh 76. Consequently, since the filter cover 70 receives pressure from the harnesses 62, a load acts on the filter membrane 78, which is of minimal rigidity.

In this instance, according to the present embodiment, as discussed previously, due to being backed up by the vehicle widthwise direction rib 118 and the vehicle heightwise direction rib 116 provided on the seal plate 74, the rigidity of the filter cover 70 is assured. Accordingly, the filter cover 70 exhibits sufficient durability. As a result, a situation is avoided in which the filter material 71 (in particular, the filter membrane 78) is prevented from becoming permanently deformed or damaged. In this manner, by providing the vehicle widthwise direction rib 118 and the vehicle heightwise direction rib 116 on the member (in this case, the seal plate 74) that constitutes the filter cover 70, the filter material 71 including the filter membrane 78 is protected from becoming permanently deformed or damaged.

Further, the closed wall portion 108 is formed on the retaining plate 72. In accordance with this feature, the strength of the retaining plate 72 can be enhanced, and therefore, the cell voltage control unit 61 located adjacent to the inner side of the retaining plate 72 can be satisfactorily protected.

After the rearward opening 40 has been covered by the filter cover 70 in the manner described above, the VCU case 152 is attached to the rear portion 36*d* of the stack case 20. More specifically, the mounting bolts 156 are inserted through the through holes 158 and screwed into the non-illustrated bolt holes.

When the fuel cell vehicle 12 shown in FIG. 1 is in operation, the fuel cell stack 18 is supplied with a fuel gas, an oxygen containing gas, and a coolant. The fuel gas is supplied to the anode of each of the unit cells 34, whereas the oxygen containing gas is supplied to the cathode of each of the unit cells 34. Consequently, electrical power is generated in each of the unit cells 34, and in accordance therewith, the traveling motor 26 is energized. As a result, traveling of the fuel cell vehicle 12 is started. Moreover, the coolant is also supplied to each of the unit cells 34.

While the fuel cell vehicle 12 is traveling, it is expected that foreign matter S such as gravel or the like may be flipped up by the tires and fly into the front room 16. In the case that such a situation occurs, the foreign matter S impinges against the VCU case 152. As can be understood from such an occurrence, the filter cover 70 is protected by the VCU case 152, which covers the filter cover 70, from large scale foreign matter S that has entered into the front room 16.

Further, in the case that the foreign matter S enters between the stack case 20 and the VCU case 152 through the ventilation openings 160, the filter membrane 78 is protected by the outer protective mesh 80. Therefore, it is possible to avoid a situation in which it becomes impossible to capture fine foreign matter due to damage to the filter membrane 78 or the like. Furthermore, due to the closed wall portion 108 that covers the cell voltage control unit 61, the cell voltage control unit 61 inside the stack case 20 is also protected from such foreign matter S.

A portion of the traveling wind reaches a lower part of the rear portion 36*d* of the stack case 20. In addition, the traveling wind passes through the ventilation openings 120 of the seal plate 74, the meshes of the outer protective mesh 80, the ventilation openings 106Ld, 106Lm, 106Lu, 106Rd, and 106Ru of the retaining plate 72, the pores of the filter membrane 78, and the meshes of the inner protective mesh 76, and enters into the interior of the stack case 20 from the rearward opening 40. In the case that the traveling wind is accompanied by fine foreign matter such as sand grains and dust or the like, the foreign matter is captured by the outer protective mesh 80 and the filter membrane 78. Accordingly, it is difficult for such foreign matter to enter into the stack case 20.

The temperature of the fuel cell stack 18 inside the stack case 20 rises accompanying the generation of electrical power by each of the unit cells 34. Therefore, heat is given from the fuel cell stack 18 to the traveling wind that has entered into the interior of the stack case 20. Consequently, the traveling wind causes a rise in temperature, and the traveling wind rises inside the stack case 20. On the other hand, the fuel cell stack 18 is cooled by the traveling wind.

In the case that the fuel gas leaks out from the fuel cell stack 18 into the stack case 20, since the specific gravity of hydrogen in the fuel gas is smaller than that of air, the hydrogen also rises inside the stack case 20, and joins in flowing with the traveling wind. The traveling wind (and hydrogen) is discharged to the exterior of the stack case 20 flowing from the upper part of the rearward opening 40 through the meshes of the inner protective mesh 76, the pores of the filter membrane 78, the ventilation openings 106Ld, 106Lm, 106Lu, 106Rd, and 106Ru of the retaining plate 72, the meshes of the outer protective mesh 80, and the ventilation openings 120 of the seal plate 74. The traveling wind (and hydrogen) further reaches the front room 16 through the ventilation openings 160, and is dissipated into the atmosphere from the front room 16.

In the case that it becomes necessary to perform maintenance with respect to the fuel cell stack 18 (in particular, the cell V terminals 60 and the like), the operator may loosen the mounting bolts 156 and remove the VCU case 152 from the stack case 20, and furthermore, may loosen the fixing bolts 122 and separate the filter cover 70 from the stack case 20. Since the rearward opening 40 is made visible accompanying such separation, maintenance can be easily performed on the cell V terminals 60 and the like which are exposed in the rearward opening 40.

The present invention is not limited to the above-described embodiment, and various modifications can be made thereto within a range that does not depart from the essence and gist of the present invention.

Figure 8:
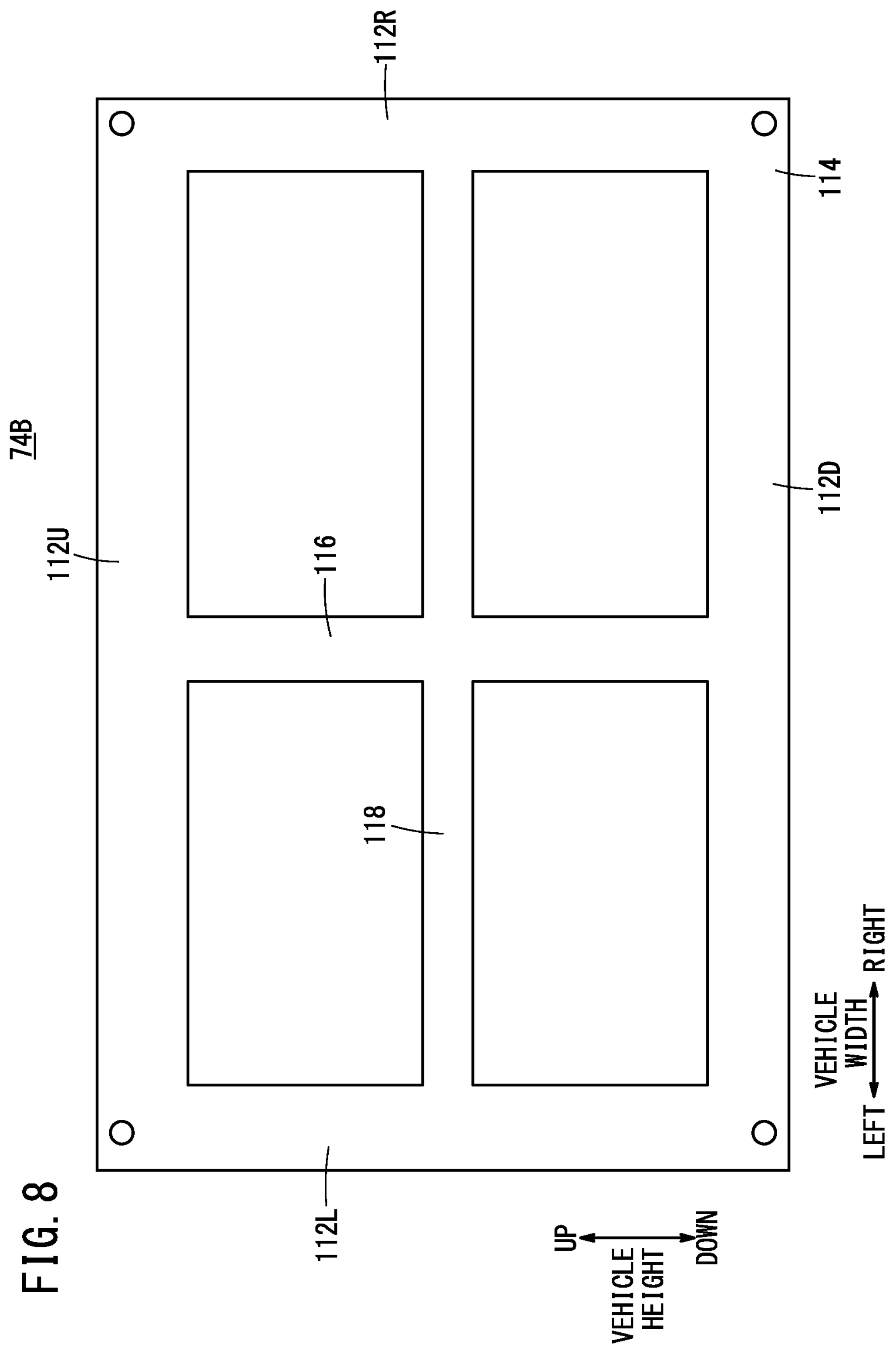
FIG. 8 is an overall schematic front view of a seal plate (retaining frame member) having a different shape.

For example, as shown in FIG. 8, a seal plate 74B may be adopted in which the vehicle widthwise direction rib 118 extends beyond the vehicle heightwise direction rib 116 until connecting with the right vertical side portion 112R. Further, the intersecting direction rib is not limited to the vehicle widthwise direction rib 118, and may be any rib extending in a manner so as to intersect with the vehicle heightwise direction rib 116. In addition, it is not essential that a rib be provided in an intersecting direction such as the vehicle widthwise direction rib 118, and only the vehicle heightwise direction rib 116 may be provided.

Furthermore, the shape of the ventilation openings 106Ld, 106Lm, 106Lu, 106Rd, and 106Ru of the retaining plate 72 may be of a shape other than a rectangular shape (e.g., a circular shape or the like).

What is claimed is:

1. A fuel cell system configured to be mounted in a vehicle equipped with a fuel cell stack, and a stack case in which the fuel cell stack is accommodated, wherein:

the fuel cell stack is configured by unit cells being stacked along a vehicle widthwise direction;

a rearward opening in which cell voltage detection terminals electrically connected to electrodes of the unit cells are exposed is formed at a rear portion of the stack case facing rearwardly in a traveling direction of the vehicle, together with a filter cover including a filter material being provided on the rearward opening; and the filter cover includes a vehicle heightwise direction rib configured to extend along a heightwise direction of the vehicle.

2. The fuel cell system according to claim 1, wherein the filter cover comprises an intersecting direction rib configured to extend in a direction intersecting the vehicle heightwise direction rib.

3. The fuel cell system according to claim 2, wherein the filter cover is connected to the stack case, whereby the filter material being sandwiched between the filter cover and the stack case, and the filter cover includes a retaining frame member that is formed with a ventilation opening.

4. The fuel cell system according to claim 3, wherein the retaining frame member is formed with the vehicle heightwise direction rib.

5. The fuel cell system according to claim 4, wherein the retaining frame member is formed with the vehicle intersecting direction rib.

6. The fuel cell system according to claim 3, wherein the retaining frame member is formed with the vehicle intersecting direction rib.

7. The fuel cell system according to claim 1, wherein conductive wires configured to extend from the cell voltage detection terminals are in contact with the filter material.

8. The fuel cell system according to claim 1, wherein the filter material is constituted by an inner protective mesh, a filter membrane, and an outer protective mesh configured to be stacked sequentially in this order from a side in proximity to the stack case.

9. The fuel cell system according to claim 8, wherein the filter cover retains the filter membrane from a side of the outer protective mesh, and further comprises a retaining member that is formed with ventilation openings.

* * * * *